O. SCHWIMMER.
GAS SHUT-OFF CONTROL FOR WATER HEATERS.
APPLICATION FILED AUG. 2, 1920.
1,386,370.
Patented Aug. 2, 1921.
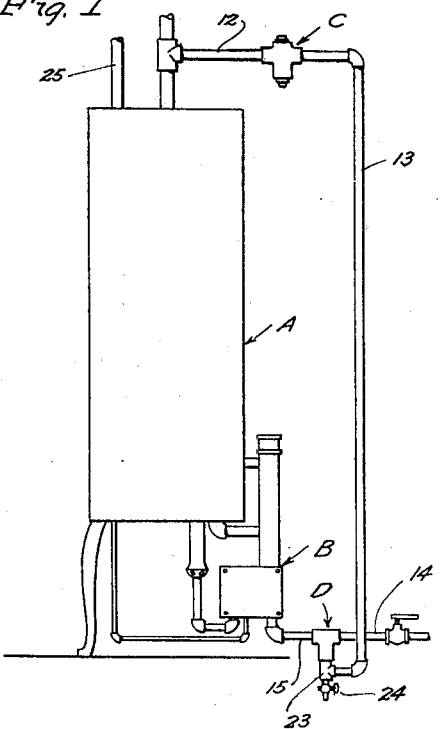
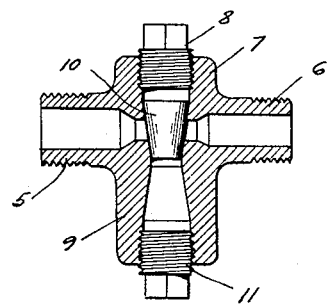
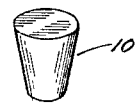
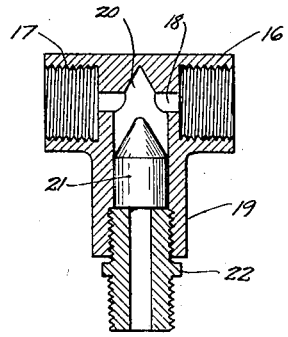
Inventor:
Oscar Schwimmer
by Nestall and Wallace
his Attorneys

UNITED STATES PATENT OFFICE.

OSCAR SCHWIMMER, OF LOS ANGELES, CALIFORNIA.

GAS-SHUT-OFF CONTROL FOR WATER-HEATERS.

1,386,370.  Specification of Letters Patent.  Patented Aug. 2, 1921.

Application filed August 2, 1920. Serial No. 400,861.

*To all whom it may concern:*

Be it known that I, OSCAR SCHWIMMER, a citizen of the United States, residing in Los Angeles, in the county of Los Angeles and State of California, have invented new and useful Improvements in a Gas-Shut-Off Control for Water-Heaters.

This invention relates to a system of shutting off the supply of fuel to the burner of a water heater when the temperature of the water reaches a critical point.

It is an object of this invention to provide means whereby the water of a heater will be by-passed to actuate a valve controlling the fuel supply to the burner upon the temperature reaching a critical point. It is another object of this invention to provide a fusible plug structure having a plug, the material of which when melted will be caught and remolded. It is a further object of this invention to provide a fusible plug structure of the character described adapted for removal of the remolded plug and reinsertion in operative position.

These objects, together with other objects and corresponding accomplishments, are obtained by means of the embodiment of my invention illustrated in the accompanying drawing, in which—

Figure 1 is an elevation of a well known type of heater with my system applied thereto; Fig. 2 is an enlarged axial section of the fusible plug structure; Fig. 3 is a perspective view of the fusible plug; and Fig. 4 is an enlarged axial section of the fuel valve.

Referring more particularly to Fig. 1, A indicates a water tank equipped with a burner having a thermostatic control B for the gas. Connected with the hot water outlet by means of pipe is a fusible plug structure C, which is connected by pipe to the gas shut-off valve D.

The fusible plug structure is in the form of a cross having an inlet 5, threaded on the exterior to form a nipple and a corresponding outlet 6. The upper arm 7 is threaded on the interior to receive a closure plug 8, squared at the top to form a wrench hold. The bore of the arm 7 is tapered at the point that it communicates with the passage between the inlet and outlet. The tapered portion extends into the arm 9 so that a fusible plug 10 inserted therein will close the passage from inlet to outlet. The fusible plug is of frustoconical form. The bore of arm 9 is reversely tapered with respect to the taper of the bore in arm 7, the degree of taper being the same as the fusible plug. A cylindrical portion connects the two tapered portions. Threaded into the bore of arm 9 is a closure plug 11 having a wrench hold and being identical in structure with plug 8. By-pass pipe 12 connects the arm 5 with the hot water outlet and pipe 13 connects the arm 6 with the gas shut-off.

A gas pipe line 14 for the supply of fuel is connected to the gas shut-off D, and a pipe 15 connects the shut-off with the thermostatic gas control B. The gas control shut-off is of T-form having an interiorly threaded inlet 16, and a corresponding outlet 17. The inlet and outlet are connected by a port 18. The center arm of the T indicated by 19 has a cylindrical bore with a conical portion 20 which crosses the port 18 and forms a seat for a piston valve 21 slidably mounted in the bore. The bore is threaded at its end and mounted therein is a coupling 22. Secured to the coupling 22 is a T pipe fitting 23, to one arm of which the pipe 13 is connected and to another arm of which is connected a tap 24.

The type of water heater shown is intended to maintain the water in the heater at a given temperature. If, however, due to some derangement of the system, the water in the boiler should be overheated to the melting temperature of the fusible plug, the latter will be gradually melted from the inlet side until water may pass from the inlet to the outlet. The material of the fusible plug will drop as it is melted into the tapered portion of arm 9 and be remolded to form a plug. Water can thus pass through pipe 13 forcing in air ahead of it against the piston valve 21 and seating the latter in the tapered portion 20 closing the port 18 and thereby shutting off the flow of gas. The air which is bound in the pipe 13 will act as a cushion in closing the valve 21. The supply of gas to the burner is thus cut off and the burner extinguished.

To place the system in operation again, the water pressure is shut off. This may be conveniently done by closing the valve leading to the cold water inlet 25—not shown herein—but being a common accessory with water heaters. The tap 24 is now opened to permit the water to be drained from the shut-off D and from the pipe 13. Closure plug 11 of the fusible plug structure is removed and the remolded plug removed from the bore. The plug 11 is then reinserted and closure plug 8 removed. The remolded fusible plug is then inserted in its seat closing the passage between inlet 5 and outlet 6. The tap 24 is closed and the structure is again ready for operation.

Although I have shown my system applied to a water heater having a thermostatic control, with which type of heater it would be least necessary, it is not limited to this type of heater. Its greatest use would be found with the ordinary water heater having nothing but a manual control for the burner.

What I claim is:

1. The combination with a water heater provided with a burner having a fuel supply, of a hot water by-pass, a fusible plug structure comprising a bore for the plug to seat in and occlude the by-pass, a corresponding opposing bore disposed out of the path of said by-pass so as to receive the melted material of said plug and remold the latter, means to remove said remolded plug and insert it in its seat, and a valve structure to shut off the supply of fuel to said burner connected to said by-pass so as to be actuated by movement of water therein.

2. The combination with a water heater provided with a burner having a fuel supply, of a hot water by-pass, a fusible plug structure comprising a bore for the plug to seat in and occlude the by-pass, a corresponding opposing bore disposed out of the path of said by-pass so as to receive the melted material of said plug and remold the latter, means to remove said remolded plug and insert it in its seat, and a piston valve disposed in the fuel supply line, said by-pass being connected to said piston valve so that pressure therein will move the latter to closing position.

3. A fusible plug structure comprising a casing having intersecting bores, two of said bores forming an inlet and outlet for fluid, a plug bore arranged for the insertion of and forming a seat for a fusible plug to occlude the passage between said inlet and outlet, and a remold bore disposed out of the path of said inlet and outlet connecting with said plug bore and having a portion of corresponding contour to receive the material of the melted plug and remold the same and arranged to permit removal of the remolded plug.

4. A fusible plug structure comprising a casing having intersecting bores, two of said bores forming an inlet and outlet for fluid, a plug bore forming a seat for a fusible plug to occlude the passage between said inlet and outlet, a remold bore disposed out of the path of said inlet and outlet connecting with the said plug bore and having a portion of corresponding contour to receive the material of the melted plug and remold the same, means to close the plug bore and to permit insertion and removal of the plug, and means to close the remold bore and to permit removal of the remolded plug.

5. A fusible plug structure comprising a casing having intersecting bores, two of said bores forming an inlet and outlet for fluid, a frustoconical plug bore forming a seat for a fusible plug to occlude passage between said inlet and outlet, a remold bore disposed out of the path of said inlet and outlet, communicating with the said plug bore and having a frustoconical portion of corresponding contour to said plug bore for receiving the material of the melted plug and remolding the same, a closure plug to close the plug bore and to permit insertion and removal of the same, and a closure plug to close the remold bore and permit removal of the remolded plug.

In witness that I claim the foregoing I have hereunto subscribed my name this 28th day of July, 1920.

OSCAR SCHWIMMER.